United States Patent

[11] 3,633,454

[72] Inventors Jack N. Schmitt;
Paul E. Hodges, Jr., both of 1300 Penobscot Bldg., Detroit, Mich. 48226
[21] Appl. No. 15,766
[22] Filed Mar. 2, 1970
[45] Patented Jan. 11, 1972

[54] CONNECTOR PLATE
1 Claim, 7 Drawing Figs.
[52] U.S. Cl. .................................................. 85/13
[51] Int. Cl. ............................................ B43m 15/00
[50] Field of Search .......................................... 85/13, 49;
287/20.92 CP; 52/DIG. 6

[56] References Cited
UNITED STATES PATENTS

| | | | |
|---|---|---|---|
| 3,242,788 | 3/1966 | Broder ........................ | 85/13 |
| 3,322,018 | 5/1967 | Moehlenpah et al. ........ | 85/13 |
| 3,347,126 | 10/1967 | Templin et al. ............... | 85/13 |
| 3,362,277 | 9/1968 | Moehlenpah et al. ........ | 85/13 |
| 3,417,651 | 12/1968 | Moehlenpah ................. | 85/13 |
| 3,454,292 | 7/1969 | Sanford ....................... | 85/13 |
| 3,479,920 | 11/1969 | Sanford ....................... | 85/13 |
| 3,498,170 | 3/1970 | Sanford ....................... | 85/13 |

*Primary Examiner*—Marion Parsons, Jr.
*Attorney*—Cullen, Settle, Sloman & Cantor ABSTRACT: A connector plate, for connecting abutting wood members, formed of a sheet having numerous punched-out, narrow, elongated openings, with the punched-out material forming integral, identical mirror-image teeth at each end of their respective openings. The ends of the teeth are cut diagonally. The half of each tooth adjacent to the sheet is formed with a convex outer surface and V-shaped inner surface, and the free half of each tooth is formed generally flattened and gradually twisted around an axis perpendicular to the sheet so that its free diagonal edge is at a roughly 45° angle relative to the long edges of its respective opening.

INVENTORS
JACK N. SCHMITT
PAUL E. HODGES, JR

ATTORNEYS

CONNECTOR PLATE

BACKGROUND OF INVENTION

In the construction of houses and the like buildings, roof trusses and wall sections are frequently prefabricated at sites remote from the construction site and then brought to the construction site for assembly. In this type of construction, the wood members which are used to fabricate a roof truss or wall section are frequently connected together by means of connector plates.

Such plates have generally been formed of a sheet of stiff, relatively rigid sheet metal having integral, struck-out teeth. In use, the wood members are aligned or abutted for assembly and then the connector plates are laid over the joints and pressed into the wood so that the teeth pierce the wood and the plate serves as the connection means between the individual wood members.

An example of this type of connector plate is disclosed in U.S. Pat. No. 3,242,788 granted Mar. 29, 1966, to Broder.

Joints formed of such types of plates are generally strong; however, the teeth of the plates are subjected to relatively high shear loads and therefore, tend to work free of the wood. This is aggravated by the normal expansion and contraction and other movement of wood fibers over periods of time with varying temperature and weather conditions. Thus, it is desirable to provide such types of plates with teeth which have the maximum resistance to shear loads and the maximum ability to interlock with the wood fibres and remain so interlocked despite varying conditions. The invention herein relates to such type of teeth constructions which considerably improve the plate utility and diminish the foregoing problems.

SUMMARY OF INVENTION

The invention herein contemplates forming the integral teeth struck out of a connector plate with an inner or lower half having one, outer convex surface or face and opposite, inner face formed in a V-shape, with the outer or extremity portion of the teeth twisted and flattened so as to gradually increase in angularity to a point of about roughly 45° at its extreme edge relative to the initial angle of the tooth. This construction includes a sharp crease line which forms a V-shaped surface, which crease line changes its direction near the outer edge of the tooth, to thereby provide a configuration which is unusually resistant to shear loads and which has a tendency to curl or twist and interlock with the wood fibers, thereby substantially reducing any tendency of the teeth to become loose after a period of time and changing weather conditions.

Thus, although the connector plate herein is superficially quite similar to that previously used, such as that illustrated in the above mentioned patent, the small changes in the configuration of the teeth provide a substantial difference in the results produced, namely a greatly strengthened plate, more resistant to shear loads, and highly resistant to removal from or loosening relative to the wood members.

Further objects and advantages of this invention will become apparent upon reading the following description, of which the attached drawings form a part.

DETAILED DESCRIPTION

Figure 1:
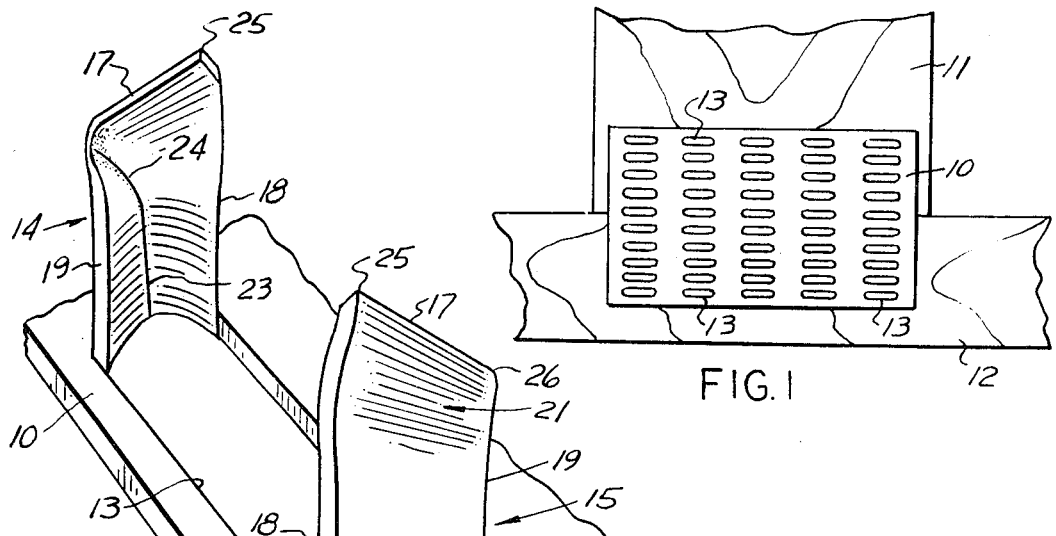
FIG. 1 is a plan view of a joint formed between two wood members overlapped by the connector plate herein.

FIG. 1 illustrates a connector plate 10 formed of a stiff, rigid, sheet metal, used to interconnect a pair of abutting wood members 11 and 12 to form a joint. The wood members may form part of a truss assembly or wall section or the like.

The plate is provided with rows of punched-out openings 13, which are narrow and elongated and aligned as illustrated in FIG. 1. The material punched out of each opening is split into two opposite tooth-forming portions which provide integral teeth 14 and 15 at the opposite ends of each opening (see FIG. 2). The teeth are identical, but mirror images.

The invention herein relates to the configuration of the teeth which produces the result of increased shear strength and increased interlocking with the wood fibers.

As illustrated in the drawings, each tooth has its upper edge cut along a diagonal to form an upper end 17 which provides a long side edge 18 and a short side edge 19 on the tooth.

Figure 2:
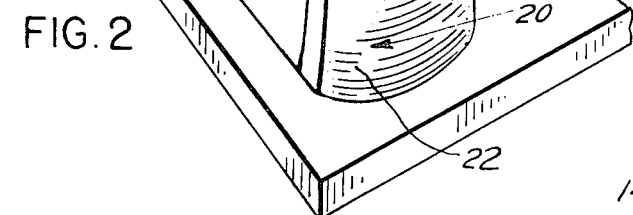
FIG. 2 is an enlarged perspective view of one pair of teeth.

Each tooth is divided along its length into a lower or inner half portion 20 and an upper or outer half portion 21. The outer face 22 of each lower portion is formed convex or outwardly bowed. However the inner face of each tooth, that is the face of the tooth facing towards its opposite tooth, is provided with a sharp crease 23 extending about halfway up along the length of the tooth so that the inner face is formed in a V-shape in cross section. The crease, as seen in FIG. 2, extends upwardly further at an angle so that its extension 24 intersects the short side edge 19 just below the tip or extremity of the short side edge 19.

Figure 3:
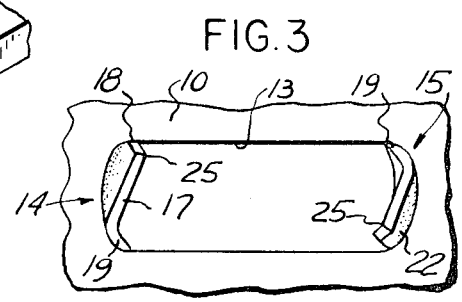
FIG. 3 is a top, plan view of a pair of teeth.
Figure 4:
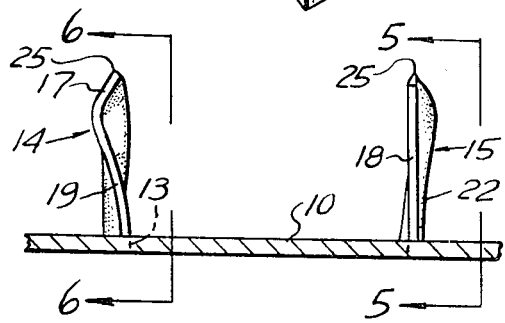
FIG. 4 is an elevational view taken in the direction of arrows 4—4 of FIG. 3.
Figure 5:
FIG. 5 is an elevational view of one tooth taken in the direction of arrow 5—5 of FIG. 4.
Figure 6:
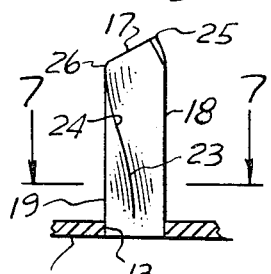
FIG. 6 is an elevational view of the opposite face of a tooth, taken in the direction of arrow 6—6 of FIG. 4.
Figure 7:
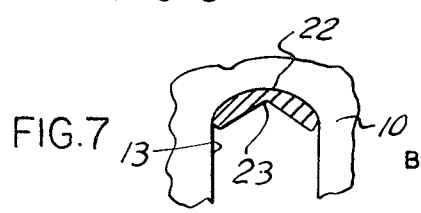
FIG. 7 is a fragmentary, cross-sectional view taken in the direction of arrow 7—7 of FIG. 6.

The upper half portion on each tooth is twisted around an axis which is perpendicular to the sheet and is generally flattened, between the crease extension 24 and the long leg 18, so that the outer edges 17 are arranged at roughly an angle of 45° relative to the long edges of their openings 13 (see FIG. 3). The tips 25 of each pair of teeth are thus closer towards each other than are the tips or extremities of the shorter legs 19 on each pair of teeth.

In the twisting, the tips 26 of the shorter legs, upwardly of the crease 24, tends to move slightly rearwardly relative to the edge 19 thus forming a slight bow 27 below and roughly parallel to the edge 17 of each tooth.

In operation, the wood members to be assembled are abutted in assembly position and a plate is laid over them with the teeth facing downwardly toward the wood members. Then the plate is pressed toward the wood so that its teeth pierce and embed within the wood. During this step, the wood fibers tend to twist and wrap around each of the teeth and interlock therewith in a permanent fashion with the fibers being under some tension so that they tend not to loosen despite expansion and contraction of the wood in varying weather conditions.

Having fully described an upper tooth embodiment of this invention, we now claim:

1. In a connector plate, for connecting together abutting pieces of wood, and comprising a thin, rigid, metal sheet having a number of identical punched openings formed therein, each opening being narrow and elongated, with the sheet material bent upward from each such opening to form a pair of identical but mirror image teeth, each integral with one end of said opening and extending perpendicular to said sheet, with each tooth having an innerface, facing towards the opposite tooth of its pair, and an opposite outer face, the improvement comprising:

each tooth having its free end formed at an acute angle relative to the sheet, with one side edge of the tooth being longer than the other;

each tooth being divided along its length into two integral half portions, namely an lower half portion located adjacent to the sheet and an upper half portion located adjacent its free end, with the lower portion having its outer face formed convex in cross section; but extending perpendicularly to the sheet;

and the upper portion being generally flattened and rotated about an axis perpendicular to the sheet to gradually increase in angularity relative to the lower portion, to the point where the free end of the tooth is arranged at a roughly 45° angle relative to the long edges of its respective opening, and the free tip of the long edge is located closer towards the opposite tooth than is the tip of the shorter edge;

with such shorter edge being bowed rearwardly near its tip;

said lower portion of the tooth inner face having a sharp crease line formed therein approximately midway between said two side edges of the tooth, to form said V-shape, with the crease extending about halfway towards said tooth's free end from the tooth's integral end and the crease then continuing at an angle to intersect with the tooth's shorter side edge near the tip of the shorter side edge, and the tooth's area between the crease and the shorter side edge being untwisted.

* * * * *